US012553284B2

(12) United States Patent
Lanzafame

(10) Patent No.: US 12,553,284 B2
(45) Date of Patent: Feb. 17, 2026

(54) REMOVABLE SUPPORT PLATFORM FOR LADDER

(71) Applicant: Philip F. Lanzafame, Poulsbo, WA (US)

(72) Inventor: Philip F. Lanzafame, Poulsbo, WA (US)

( * ) Notice: Subject to any disclaimer, the term of this patent is extended or adjusted under 35 U.S.C. 154(b) by 0 days.

(21) Appl. No.: 18/433,889

(22) Filed: Feb. 6, 2024

(65) Prior Publication Data

US 2025/0250860 A1 Aug. 7, 2025

(51) Int. Cl.

*E06C 7/14* (2006.01)
*E06C 7/16* (2006.01)
*E06C 7/18* (2006.01)
*E06C 7/48* (2006.01)

(52) U.S. Cl.

CPC ................ *E06C 7/143* (2013.01); *E06C 7/14* (2013.01); *E06C 7/16* (2013.01); *E06C 7/188* (2013.01); *E06C 7/48* (2013.01); *E06C 7/488* (2013.01)

(58) Field of Classification Search

CPC ... E06C 7/143; E06C 7/14; E06C 7/16; E06C 7/188; E06C 7/48; E06C 7/488
USPC .... 248/231.71, 231.51, 231.21, 231.81, 210; 182/116, 121, 122
See application file for complete search history.

(56) References Cited

U.S. PATENT DOCUMENTS 362,747 A * 5/1887 Higgins .................... E04G 3/26 248/237
743,899 A * 11/1903 Lynch ....................... E06C 7/16 248/238
1,895,410 A * 1/1933 Di Figlia ................ F21V 21/08 362/396
2,174,891 A * 10/1939 Maran ....................... E06C 7/16 248/210
2,419,727 A * 4/1947 Picone ...................... E06C 7/16 248/238
2,541,343 A * 2/1951 Dakin ....................... E06C 7/16 248/238
2,578,862 A * 12/1951 Tims ......................... E06C 7/16 248/238

(Continued)

FOREIGN PATENT DOCUMENTS

CN 115199204 A * 10/2022 ............... E06C 7/48
DE 202005004656 U1 * 7/2005 ............ E06C 7/143

(Continued)

OTHER PUBLICATIONS

Philip Lanzafame, "Trade Show Display", Oct. 3, 2016, 2 pages.

*Primary Examiner* — Taylor Morris
(74) *Attorney, Agent, or Firm* — Tucker Ellis LLP

(57) ABSTRACT

Provided is a platform assembly that includes a platform having a mounting channel extending downward from the bottom of the platform at a mounting side of the platform, a support arm that supports the platform and engages a ladder, and a locking mechanism attached to the mounting side of the platform. The locking mechanism is configured to cover the mounting channel while in a locked position and uncover the mounting channel while in an unlocked position. When the platform assembly is installed on the ladder and engaged with a standoff bracket installed on the ladder, the platform provides a stable and substantially level platform allowing a user to step on and off the ladder.

20 Claims, 15 Drawing Sheets

(56) References Cited

U.S. PATENT DOCUMENTS

| | | | | |
|---|---|---|---|---|
| 2,584,955 | A * | 2/1952 | Williams | B63H 20/10 248/643 |
| 2,837,306 | A * | 6/1958 | Elm | E06C 7/14 248/210 |
| 2,848,282 | A * | 8/1958 | Weber | E06C 7/16 182/101 |
| 2,856,112 | A | 10/1958 | Broderick | |
| 3,009,677 | A * | 11/1961 | Munnikhuysen | E06C 7/14 248/210 |
| 3,058,542 | A * | 10/1962 | Rogalla | E06C 1/39 182/155 |
| 3,179,205 | A | 4/1965 | Rowlette | |
| 3,288,249 | A * | 11/1966 | Gibson | E06C 7/48 182/214 |
| 3,294,197 | A * | 12/1966 | Kwiatkowski | E06C 7/16 182/120 |
| 3,734,236 | A * | 5/1973 | Houtler | E06C 7/48 182/214 |
| 3,792,750 | A * | 2/1974 | Madison | E06C 7/185 182/206 |
| 3,792,756 | A * | 2/1974 | Kelly | E06C 7/48 182/93 |
| 3,829,051 | A * | 8/1974 | Emmons | E06C 7/14 248/238 |
| 3,899,045 | A * | 8/1975 | Geisel | E06C 7/16 182/121 |
| 3,940,824 | A * | 3/1976 | Gioia | B44D 3/126 248/210 |
| 3,985,203 | A | 10/1976 | Erlenbach | |
| 4,085,819 | A * | 4/1978 | Ohnstad | E06C 7/16 182/121 |
| 4,121,692 | A * | 10/1978 | Morawski | E06C 7/16 182/129 |
| 4,306,700 | A * | 12/1981 | Bell | E06C 7/16 248/238 |
| 4,318,523 | A * | 3/1982 | Weatherly | E06C 7/143 248/210 |
| 4,331,217 | A | 5/1982 | Stecklow | |
| 4,401,187 | A * | 8/1983 | Van Patten | E06C 7/16 248/238 |
| 4,437,544 | A * | 3/1984 | Anderson | E06C 7/165 182/120 |
| 4,489,911 | A * | 12/1984 | Riley | E06C 7/143 248/238 |
| 4,653,608 | A * | 3/1987 | Casada | E06C 7/143 248/238 |
| 4,862,994 | A * | 9/1989 | Hughes, Sr. | E06C 7/14 248/238 |
| 4,911,265 | A * | 3/1990 | Skaggs | E06C 7/16 248/238 |
| 5,052,581 | A * | 10/1991 | Christ | E06C 7/14 220/570 |
| 5,099,952 | A | 3/1992 | Farrell | |
| 5,191,954 | A * | 3/1993 | Ledford | E06C 7/16 248/210 |
| 5,388,665 | A * | 2/1995 | Newman | E06C 7/16 182/118 |
| 5,460,241 | A * | 10/1995 | LaBelle | E06C 7/16 182/121 |
| 5,484,036 | A * | 1/1996 | Cothern | E06C 7/48 182/214 |
| 5,779,208 | A * | 7/1998 | McGraw | E06C 7/165 182/120 |
| 5,855,252 | A * | 1/1999 | Vrolyks | E06C 7/48 182/214 |
| 5,899,296 | A | 5/1999 | Lantz | |
| 5,950,972 | A * | 9/1999 | Irish | E06C 7/14 248/210 |
| 5,960,905 | A * | 10/1999 | Gardner | E06C 7/143 248/210 |
| 6,044,930 | A * | 4/2000 | Hayman | E06C 1/34 182/206 |
| 6,082,270 | A * | 7/2000 | Zerger | B60N 3/001 108/42 |
| 6,237,799 | B1 * | 5/2001 | Emerson | A47B 23/025 220/570 |
| 6,637,548 | B2 * | 10/2003 | Pass | E06C 7/16 182/120 |
| 6,691,825 | B2 * | 2/2004 | Haig | E06C 7/482 248/238 |
| 6,942,063 | B1 * | 9/2005 | Huett, Jr. | E06C 7/16 248/210 |
| 7,077,238 | B2 * | 7/2006 | Butler | E06C 7/14 248/210 |
| 7,134,525 | B1 * | 11/2006 | Ferris | E06C 7/486 182/206 |
| 7,254,895 | B1 * | 8/2007 | O'Donnell | B25B 5/04 248/231.51 |
| 7,708,248 | B2 * | 5/2010 | Lagobi | A47G 23/0225 248/231.21 |
| 7,753,170 | B1 * | 7/2010 | Gibson | E06C 7/482 248/210 |
| 7,861,826 | B2 * | 1/2011 | Meyers | E06C 7/16 182/120 |
| 7,950,612 | B2 * | 5/2011 | Conner, Sr. | E06C 7/14 206/1.9 |
| 8,011,476 | B1 * | 9/2011 | Alcon | E06C 7/16 182/116 |
| 8,123,000 | B2 * | 2/2012 | Whitaker | E06C 7/143 248/238 |
| 8,251,180 | B1 * | 8/2012 | Paige | E06C 7/48 182/214 |
| 8,365,863 | B2 * | 2/2013 | Astor | E06C 7/14 248/238 |
| 8,839,906 | B1 * | 9/2014 | Furr | E06C 7/482 182/214 |
| 8,925,685 | B2 * | 1/2015 | Dufour | E06C 7/14 248/210 |
| 9,593,531 | B2 * | 3/2017 | Ballard | E06C 7/48 |
| 9,598,903 | B2 * | 3/2017 | Miller | E06C 7/14 |
| 9,834,988 | B1 * | 12/2017 | Arduna | E06C 7/165 |
| 10,035,255 | B2 * | 7/2018 | Cindric | B25H 1/10 |
| 10,221,625 | B1 * | 3/2019 | Bernhard, Jr. | E06C 7/14 |
| 10,358,832 | B1 * | 7/2019 | Wagner | E04G 5/003 |
| 10,619,416 | B1 * | 4/2020 | Snell | E06C 7/06 |
| 10,900,283 | B1 | 1/2021 | Sheets | |
| 11,969,086 | B2 * | 4/2024 | Christensen | A47B 5/02 |
| 2002/0121407 | A1 | 9/2002 | Pass | |
| 2004/0055820 | A1 * | 3/2004 | Charlton | E06C 7/188 182/107 |
| 2005/0139425 | A1 * | 6/2005 | Thomas | E06C 1/34 182/214 |
| 2006/0191744 | A1 * | 8/2006 | Keller | E06C 7/48 182/107 |
| 2006/0231333 | A1 * | 10/2006 | Proulx | E06C 7/146 182/107 |
| 2010/0006374 | A1 * | 1/2010 | Gabriel | E06C 7/165 182/116 |
| 2010/0326770 | A1 | 12/2010 | Clifford | |
| 2011/0011676 | A1 | 1/2011 | DeLair | |
| 2013/0233993 | A1 * | 9/2013 | Striepling | E06C 7/188 248/309.1 |
| 2014/0209411 | A1 | 7/2014 | McCarthy et al. | |
| 2016/0084002 | A1 * | 3/2016 | Eisler | E06C 7/16 182/126 |
| 2020/0392789 | A1 * | 12/2020 | Todd | E06C 7/14 |

FOREIGN PATENT DOCUMENTS

| | | | | |
|---|---|---|---|---|
| EP | 0106583 | A2 * | 4/1984 | E06C 7/16 |
| EP | 0360049 | A1 * | 3/1990 | E06C 7/16 |
| GB | 2075904 | A * | 11/1981 | E06C 7/14 |
| GB | 2173853 | A * | 10/1986 | E06C 7/14 |
| GB | 2193523 | A * | 2/1988 | E06C 7/14 |
| GB | 2277115 | A * | 10/1994 | E06C 7/16 |
| GB | 2327974 | A * | 2/1999 | E06C 7/48 |
| GB | 2371593 | A * | 7/2002 | E06C 7/14 |
| GB | 2434826 | A * | 8/2007 | B60R 3/007 |
| GB | 2459118 | A * | 10/2009 | E06C 7/06 |

(56) References Cited

FOREIGN PATENT DOCUMENTS

| | | | | | | |
|---|---|---|---|---|---|---|
| GB | 2408996 | B | * | 1/2010 | ............... | E06C 7/48 |
| KR | 20110134121 | A | * | 12/2011 | ............... | E06C 1/36 |
| WO | WO-0070182 | A1 | * | 11/2000 | ............... | E06C 7/16 |
| WO | WO-02059444 | A1 | * | 8/2002 | ............... | E06C 1/34 |

* cited by examiner

REMOVABLE SUPPORT PLATFORM FOR LADDER

FIELD OF INVENTION

The present invention relates generally to a support platform that can be attached to a ladder, and more particularly to a support platform that can be removably attached to a ladder to allow a user to step on or off the ladder.

BACKGROUND

Ladders can be used to access heights that a user generally would not be able to access by climbing up or down the ladder. Depending on the use, the user may need to step on or off the ladder once they have climbed up or down the ladder. For instance, a roofer may use a ladder to climb up to and access a roof to work on the roof. The same roofer may use a ladder to climb down from the roof upon completion of their work. Stepping off a ladder to an elevated surface or stepping onto a ladder from an elevated surface, like a roof, can be awkward and potentially dangerous as the user's shifting weight could shift the position of the ladder. If the ladder shifts, it may fall, and the user could potentially fall and become injured. Fall injuries are a risk common to ladder usage.

SUMMARY OF INVENTION

Disclosed is a support platform system for a ladder having a standoff bracket and a platform assembly. The platform assembly may have a platform with a top, a bottom, and a mounting channel extending downward from the bottom of the platform at a mounting side of the platform. The mounting channel may be configured to engage a mounting rail of a standoff bracket. A support arm extends down from the bottom of the platform. The support arm may have a first end configured to engage a ladder and a second end opposite the first end that is rotatably and pivotally mounted to the bottom of the platform at a proximal end of the platform. A locking mechanism may be attached to the mounting side of the platform. The locking mechanism may have unlocked position and a locked position. In the unlocked position, the mounting channel can be placed onto or removed from a mounting rail of a standoff bracket. In the locked position, a clamp covers the mounting channel when it is placed on the mounting rail and prevents the platform from being removed from the mounting rail.

The support arm can include a support arm peg configured to engage the ladder by sliding into an opening of a rung in the ladder.

The standoff bracket may have a top peg configured to engage an opening in a first ladder rung, a bottom peg configured to engage an opening in a second ladder rung below the first ladder rung, and a mounting rail that connects the top peg and the bottom peg.

The platform assembly may have a restraining strap with a first end connected to the bottom of the platform and a second end configured to wrap around the ladder and be tightened by a user to prevent the support platform system from sliding away from or disengaging the ladder. The platform assembly may have at least one shoe pivotally mounted to the bottom of the platform at a distal end of the platform and configured to rest on a roof when the support system is installed a ladder. When the standoff bracket is installed on a ladder and the platform assembly is installed on the ladder and engaged with the standoff bracket, the platform provides a stable and substantially level platform allowing a user to step on and off the ladder.

The foregoing and other features of the application are described below with reference to the drawings.

DETAILED DESCRIPTION

The disclosed support platform provides a selectably removable and adaptable solution for stepping on and off a ladder. The support platform is sufficiently lightweight so that it can be carried up and down the ladder and installed with one hand. The user of the ladder and the support platform can maintain three points of contact on the ladder in accordance with recommended safety standards. The support platform can be attached to a variety of ladders and can engage a variety of elevated surfaces, for instance roofs with different roof pitches.

Figure 1:
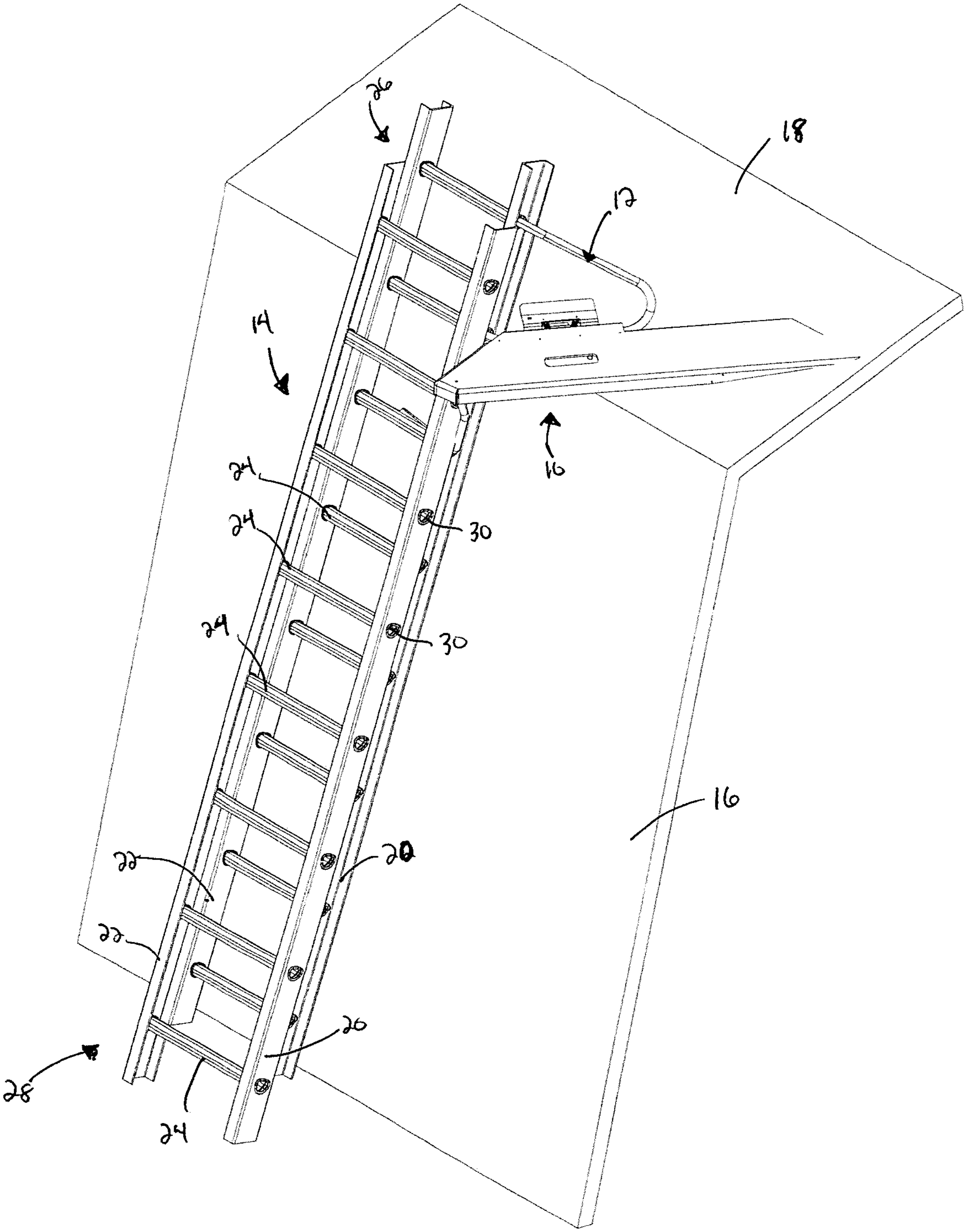
FIG. 1 is a perspective view of an exemplary platform support system installed on a ladder and in contact with a roof.
Figure 2:
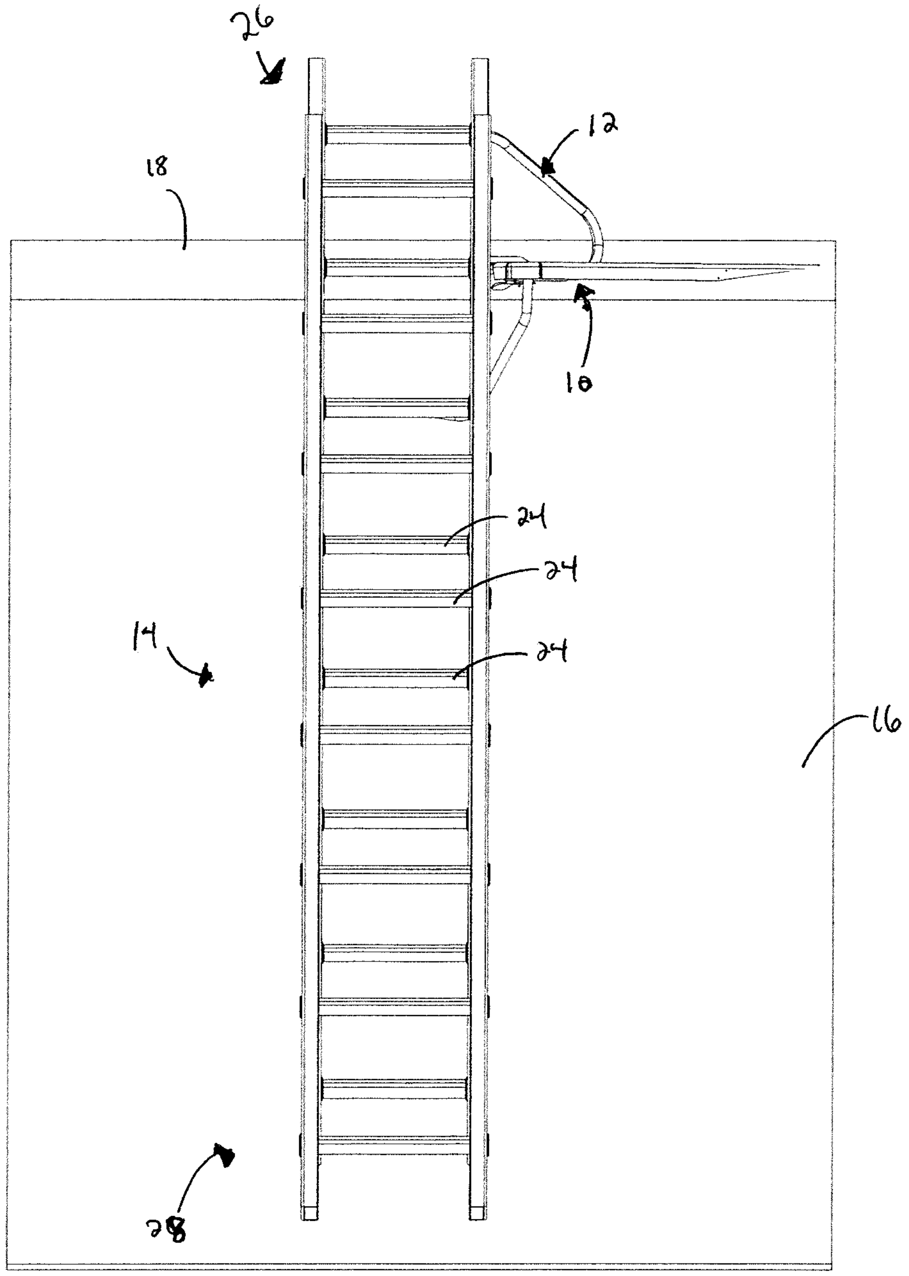
FIG. 2 is a front view of an exemplary platform support system installed on a ladder and in contact with a roof.
Figure 3:
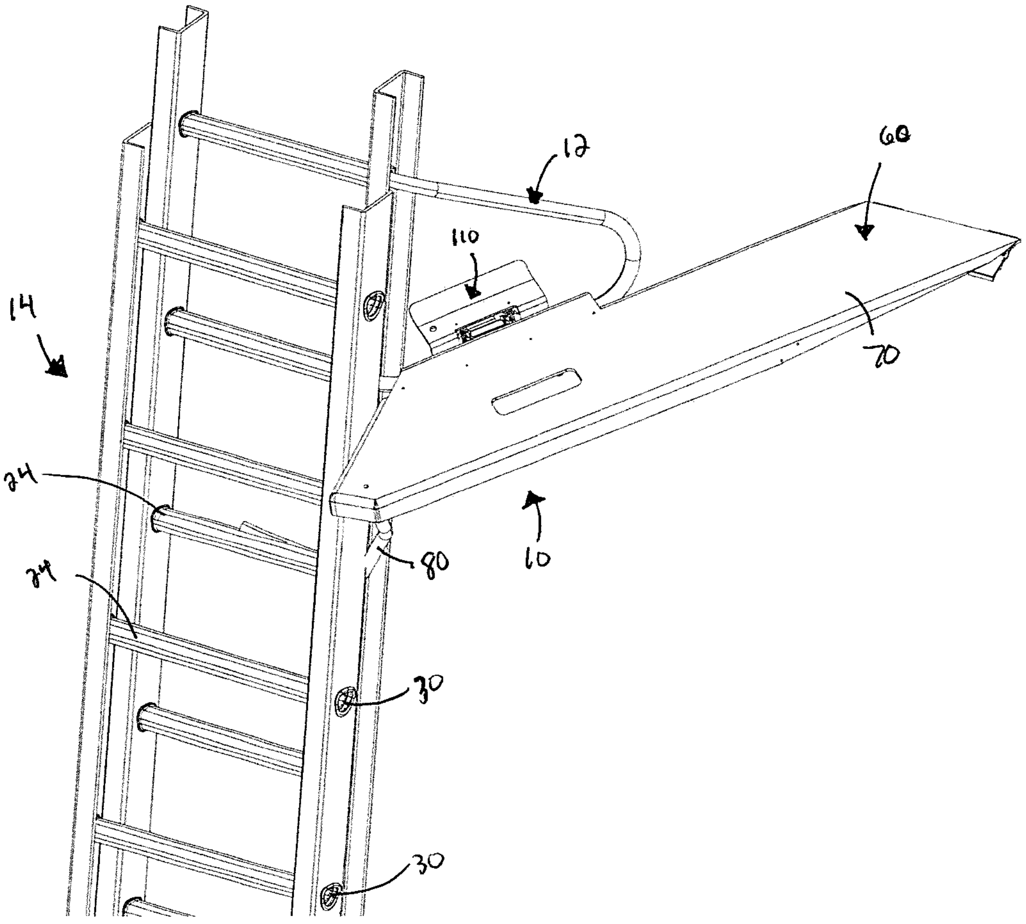
FIG. 3 is a top perspective view of an exemplary platform support system installed on a ladder.
Figure 4:
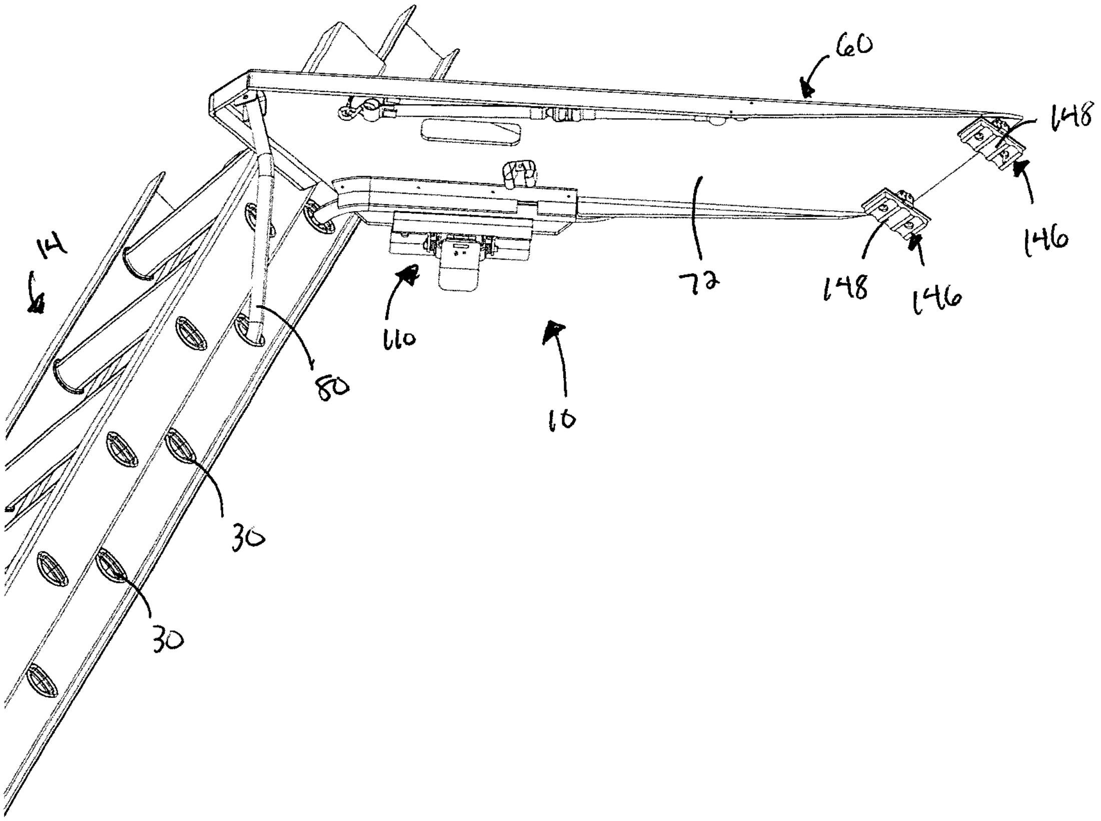
FIG. 4 is a bottom perspective front view of an exemplary platform support system installed on a ladder.
Figure 5:
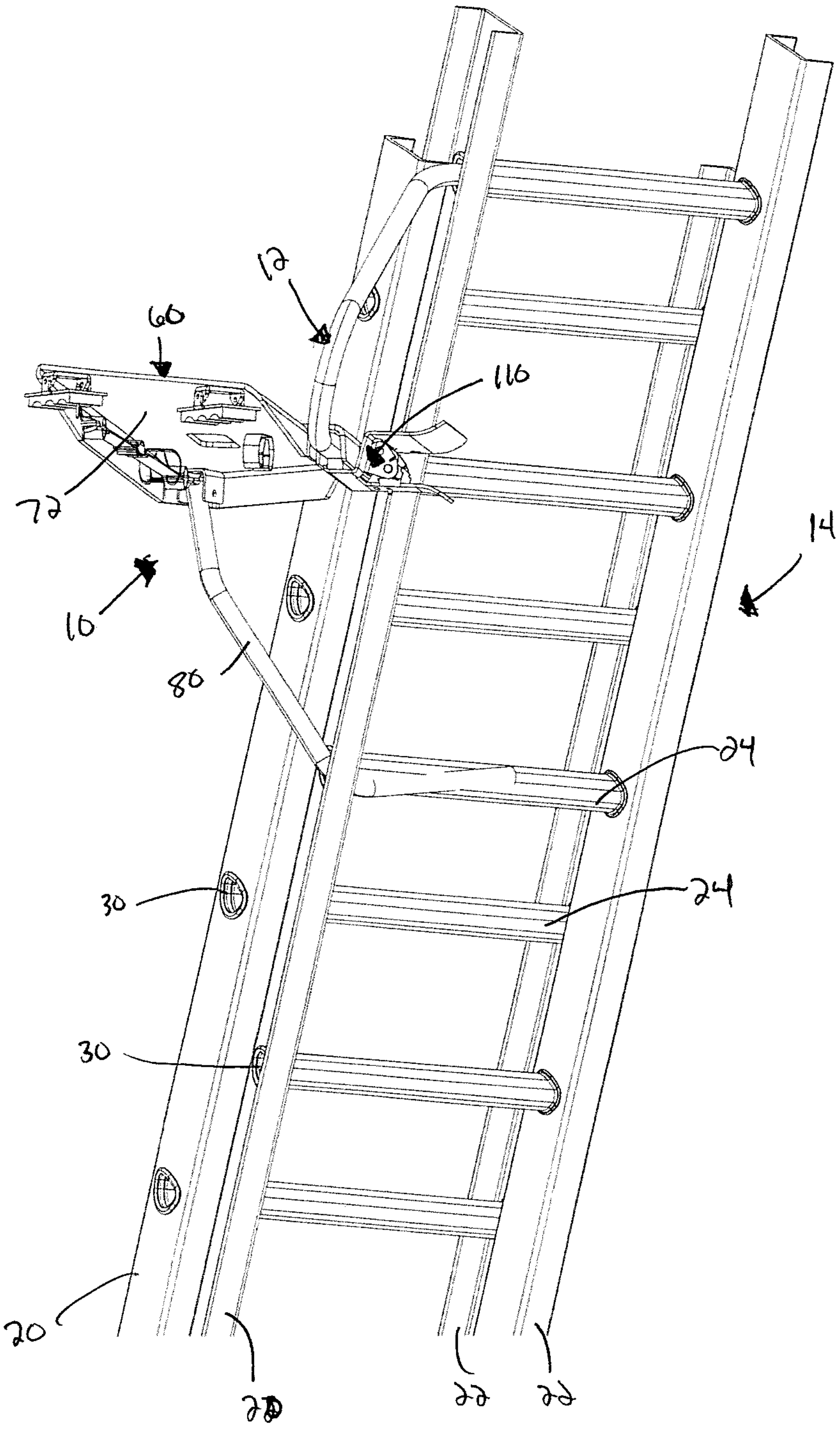
FIG. 5 is a bottom perspective rear view of an exemplary platform support system installed on a ladder.

FIGS. 1-3 illustrates a support platform assembly 10 and standoff bracket 12 installed on a ladder 14 that is in use. While in use, the ladder may rest against a wall 16 and/or a roof 18 of a structure. Alternatively, the ladder 14 may rest on the edge of the roof or the point where the wall and the roof meet. The standoff bracket 12 is configured to engage the ladder 14 as will be described below. Once the standoff bracket 12 has been installed, the support platform assembly 10 can be installed. The support platform assembly 10 is configured to engage the ladder 14 and the standoff bracket 12, and to rest on the roof 18, as further described below. Once installed, the support platform assembly 10 provides a substantially stable and level surface that allows a user to step on and off the ladder 14.

The ladder 14 has a first rail 20 and a second rail 22. Acting as steps to allow a user to climb and down the ladder, rungs 24 extend between and connect the first rail 20 and the second rail 22. The rungs 24 are evenly spaced between a top end 26 and a bottom end 28 of the ladder. As shown in FIGS. 1-6, the ladder 14 can be an extension ladder with a base section and a fly section. Other ladder variants, like straight or single ladder, may also be used.

The rungs 24 have an opening 30 at each end of the rung, where they connect to the first rail 20 and the second rail 22, respectively. For instance, the rungs 24 may be substantially hollow such that the openings are connected and form one opening that extends the length of the rungs 24. Alternatively, the rungs 24 may be solid and have an opening 30 on one or both sides that extends partially into the rung. The openings 30 in the rungs 24 are configured to receive the standoff bracket 12. The rungs 24 may have a shape or profile such that the cross section of the rung is circular, substantially rectangular or d-shaped, or any other suitable shape. If the rung profile includes a substantially flat portion, for instance with a d-shaped cross section, the flat portion of each respective rung 24 can be oriented so the flat portion or each respective rung approximately faces the top of the ladder 14.

Figure 6:
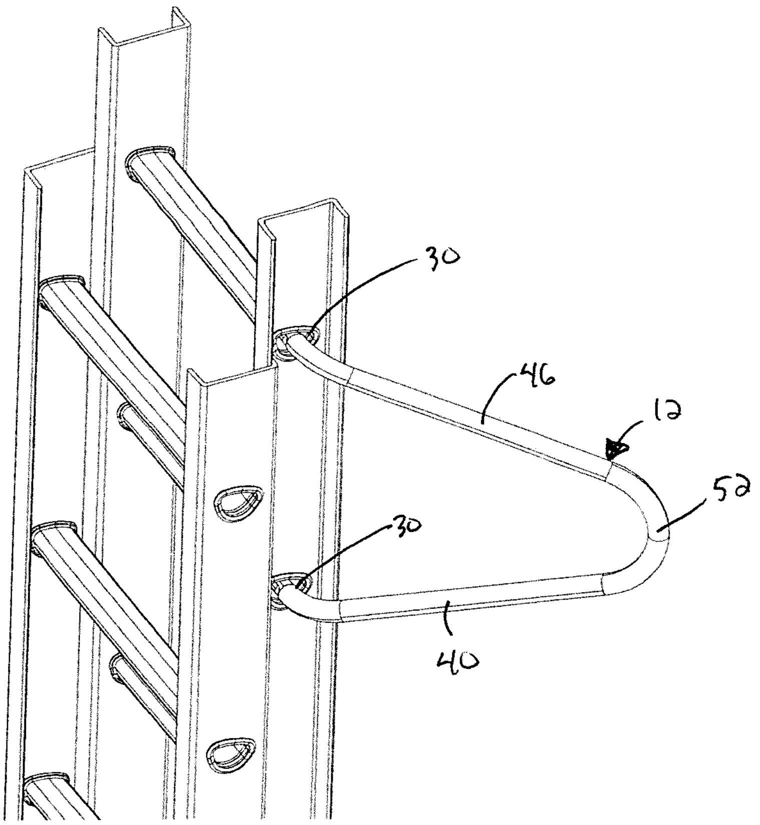
FIG. 6 is perspective view of a standoff bracket installed on a ladder.
Figure 7:
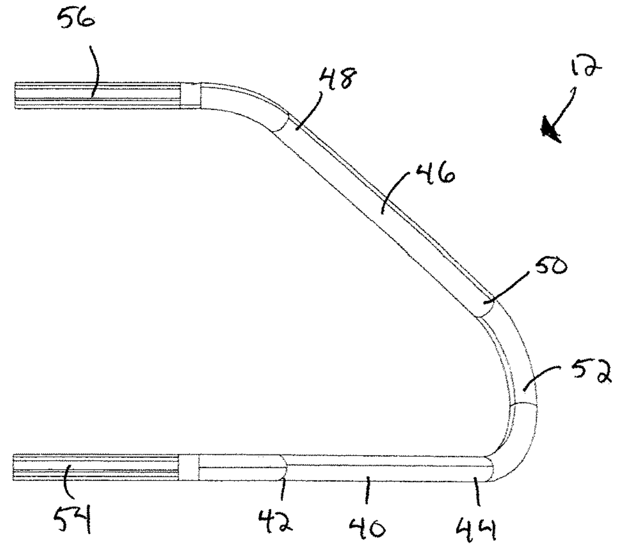
FIG. 7 is front view of a standoff bracket.
Figure 8:
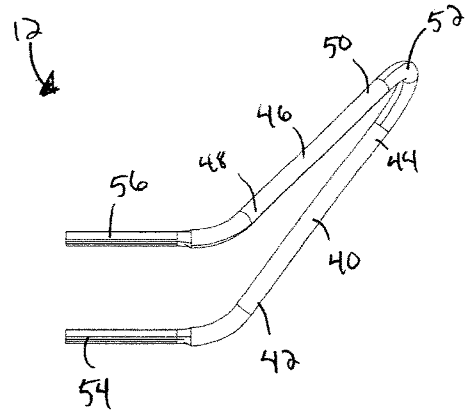
FIG. 8 is a top view of a standoff bracket.

Turning to FIGS. 6-9, the standoff bracket 12 will be described. The standoff bracket 12 has a mounting rail 40 having a first end 42 and second end 44. The standoff bracket 12 also includes a drop rail 46 with a first end 48 and a second end 50. The second end 44 of the mounting rail 40 is connected to the second end of 50 of the drop rail by a bend 52. A bottom peg 54 is connected to the first end 42 of the mounting rail 40 and a top peg 56 is connected to the first end 48 of the drop rail 46. As illustrated in FIGS. 6 and 8, the bottom peg 54 and the top peg 56 are attached at an angle, such that the first ends 42, 48 of the mounting rail 40 and the drop rail 46 are aligned with the ladder's 14 plane and the second ends 44, 50 of the mounting rail 40 and the drop rail 46 are angled away from the ladder 14 toward the wall 16 or roof 18, and are aligned on a different plane as the ladder 14. The standoff bracket 12 may be made of circular tubing, but other suitable shaped tubing, like square tubing, or brackets may be use. The tubing may be made of composites, metals such as aluminum or steel, or any other suitable material. The standoff bracket 12 can be formed from one piece of rail or pipe that is bent into the proper shape. Alternatively, the standoff bracket 12 may be formed from multiple pieces of rail or pipe that are joined together by welding or a suitable form of mechanical fastening.

Figure 9:
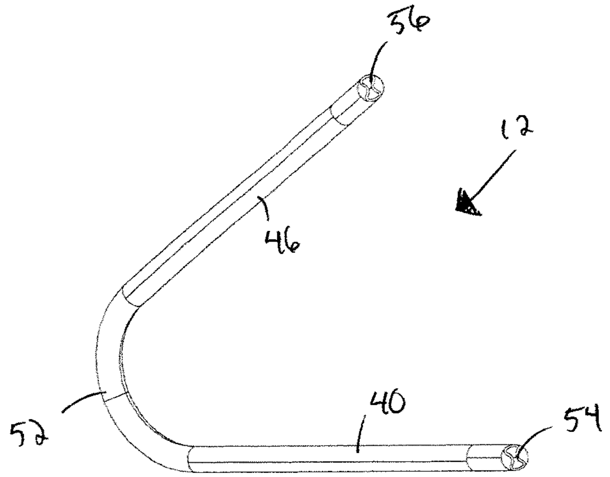
FIG. 9 is a left side view of a standoff bracket illustrating the profile of the top and bottom pegs.
Figure 10:
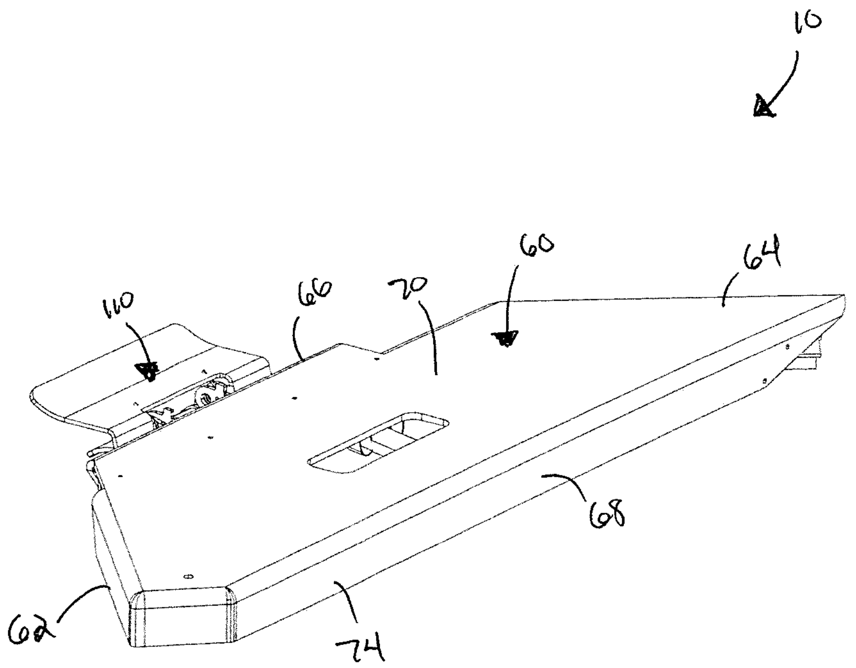
FIG. 10 is a top perspective view of the support platform assembly with the support arm in a stowed position.
Figure 11:
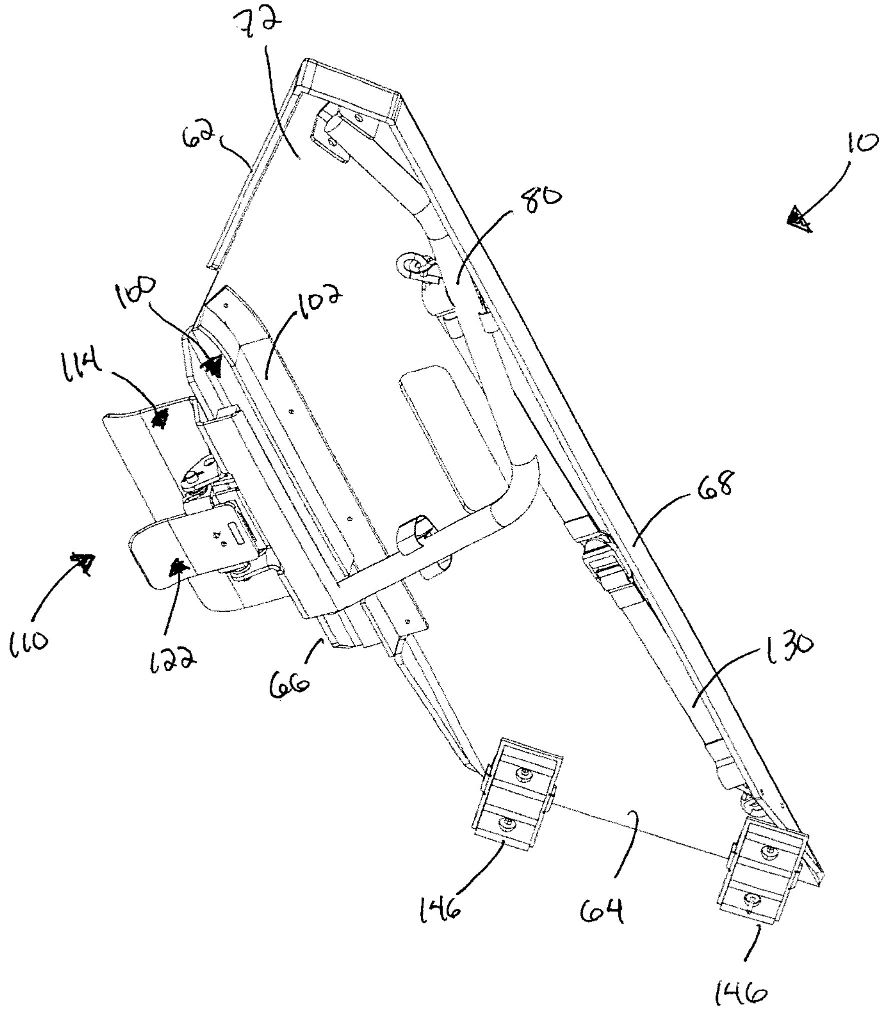
FIG. 11 is a bottom perspective view of the support platform assembly with the support arm in a stowed position.
Figure 12:
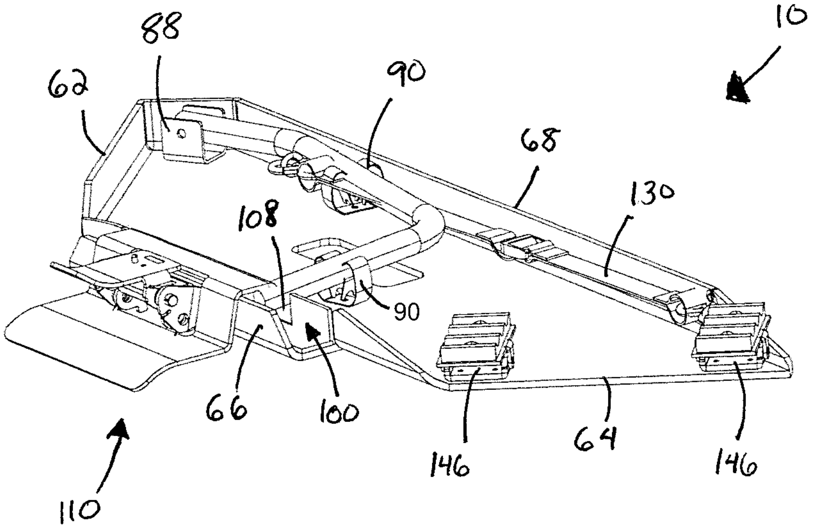
FIG. 12 is an alternative bottom perspective view of the support platform assembly with the support arm in a stowed position.
Figure 13:
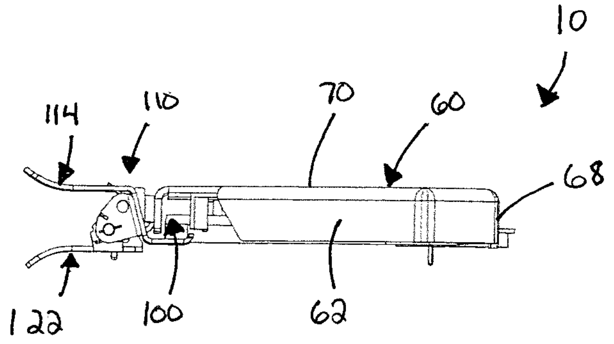
FIG. 13 is a front view of the support platform assembly.

To install the standoff bracket 12 onto the ladder 14, as shown in FIG. 6, the bottom peg 54 and the top peg 56 are configured to be inserted into the openings 30 of the rungs 24. As illustrated in FIG. 9, the bottom peg 54 and top peg 56 may have portions crimped inward to form an hourglass shape, to allow the pegs to be inserted into the openings 30 and to provide the desired fit within the openings 30. To facilitate the engagement and the orientation of the standoff bracket 12 and the rungs 24 of the ladder 14, the openings 30 may include features that extend into the opening 30 from an inner wall of the rung. The bottom peg 54 and the top peg 56 may have corresponding features. For instance, a rib may extend into the opening 30 from the inner wall of the rung and the bottom peg 54 and top peg 56 may include a corresponding slot to receive the rib. In this configuration, the bottom peg 54 and top peg 56 could not be inserted into a respective opening 30 unless the standoff bracket 12 and ladder 14 are properly aligned. Once installed onto the ladder 14, bottom peg 54 may be installed in a rung opening 30 and the mounting rail 40 may be substantially horizontal or parallel to the ground or substrate that the ladder is standing on. The drop rail 46 may be angled upward to place the top peg 56 at a height to be inserted into the above adjacent rung opening 30. Alternatively, the drop rail 46 may be angled to allow the top peg 56 to be inserted into a higher rung opening, such as the second or third rung opening above the rung opening receiving the bottom peg 54.

The support platform assembly 10 can be used with alternative standoff brackets (not illustrated) that engage ladders without open rungs. Rather than a peg configured to slide into an open rung of the ladder, the bottom peg 54 may be a bottom end configured to attach to the ladder and the top peg 56 may be a top end configured to attached to the ladder. For instance, the bottom end and the top end of the standoff bracket 12 could attach to the ladder 14 with a quick-connect base unit that engages the rungs 24 of the ladder 14 or the side rails 20, 22 of the ladder 14. The base unit could engage the ladder through physical interference with the rungs 24, a cam, or friction. Alternatively, the bottom end and the top end of the standoff bracket 12 may be connected to the ladder 14 with a pin, a nut and bolt connection, or any other suitable mechanical fastener. In yet another alternative configuration, the bottom end and the top end of the standoff bracket 12 may be connected to the ladder 14 by snapping onto or hanging from respective rungs 24.

Turning now to FIGS. 10-20, the support platform assembly 10 will be described. The support platform assembly 10 has a platform 60 with a proximal end 62 opposite a distal end 64 and a mounting side 66 opposite an open side 68. The platform 60 is generally trapezoidal with the mounting side 66 and open side 68 making up the base of the trapezoid and the proximal end 62 and the distal end making up the legs of the trapezoid. It should be appreciated that the platform 60 can be other shapes such as any quadrilateral such as a rectangle, or other polygon shapes. When installed onto the standoff bracket 12 and the ladder 14, the proximal end 62 is adjacent to the ladder 14 and the distal end 64 is configured to contact the elevated surface or roof. The mounting side 66 is configured to engage the standoff bracket 12.

The platform 60 has a top 70 that is opposite a bottom 72. When the support platform assembly 10 is installed, users step onto the top 70 of the platform 60 to step on and off the ladder 14. The top 70 may be rough or knurled to provide a slip-resistant gripping surface. Alternatively, a gripping material, for instance non-slip or grip tape, or a rubberized material, can be applied to the top 70 of the platform 60 to provide a slip-resistant surface. To provide rigidity and strength to the platform 60, sidewalls 74 may extend downward from the bottom 72 of the platform 60 around the perimeter of platform 60. The sidewalls 74 define the thickness of the platform and may taper toward the distal end 64 of the platform to facilitate contact with the roof. The platform 60 and the sidewalls 74 may be formed from one piece of sheet metal where a profile of the platform is cut out of a sheet metal blank and the sidewalls are subsequently bent downward to form the sidewalls 74. Alternatively, the platform 60 and sidewalls 74 may be made from separate pieces that are welded or fastened together. Alternatively, a combination of sheet metal forming and welding may be used to make the platform 60.

When installed, the support platform assembly 10 is a stable device allowing the user to step on and off the ladder 14. To provide stability and support to the support platform assembly 10, the support platform assembly 10 has a support arm 80 rotatably and pivotally attached to the bottom 72 of the platform 60. The support arm 80 is configured to engage a rung opening 30, which can be below the standoff bracket 12. The support arm 80 has a first end 82 having a support arm peg 84 configured to be inserted into an opening 30 of a ladder rung 24 in the same matter as described above for the pegs of the standoff bracket 12. In an alternative embodiment (not illustrated), the first end 82 of the support arm 80 may engage a ladder rung 24 with a quick-connect base unit that engages the rungs 24 of the ladder 14 or the side rails 20, 22 of the ladder 14. The base unit could engage and hold its position on the ladder through physical interference with the rungs 24, a cam, or friction. Alternatively, the first end 82 of the support arm 80 may be connected to the ladder 14 with a pin, a nut and bolt connection, or any other suitable mechanical fastener. Additionally, the first end 82 of the support arm 80 may be connected to the ladder 14 by snapping onto the rungs 24.

The support arm 80 has a second end 86 opposite the first end 82, that is configured to pivotally connect to a support arm mount 88. The support arm 80 may connect to the support arm mount 88 with a bolt, a pin, a rivet, or some other suitable mechanical connection that allows the arm to pivot in the mount. The support arm mount 88 may be a u-shaped bracket that is rotatably connected to the bottom 72 of the platform 60 near the proximal end 62 and the open side 68. The pivoting and rotating motion provided by the support arm mount 88 allows the user to effectively insert the support arm peg 84 in an opening 30 in a rung 24 and rotate and pivot the platform 60 into position to engage the standoff bracket 12 as will be further described below.

The support arm 80 can be selectively maneuvered into a stowed position and an open position. In the stowed position (depicted in FIG. 11), the support arm 80 is rotated and pivoted down towards the bottom 72 of the platform 60 so that it is lying substantially flat against the bottom 72 of the platform 60 in the recess created by the bottom 72 and sidewalls 74 of the platform 60. At least one retaining clip 90 is connected to the bottom 72 of the platform 60 to hold the support arm 80 in the stowed position. In the stowed position, the support platform assembly 10 is substantially flat and takes up less space when transporting and storing the support platform assembly 10. In the open position, the support arm 80 can move as described above.

Figure 16:
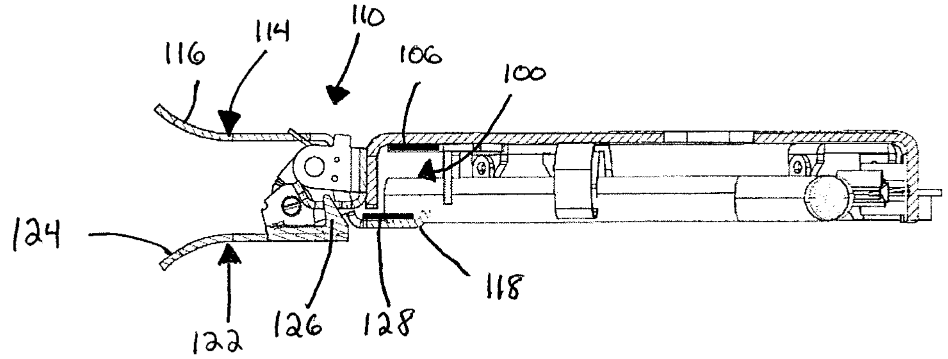
FIG. 16 shows the cross section indicated by line A-A in FIG. 14 and shows the locking mechanism in a locked position.
Figure 17:
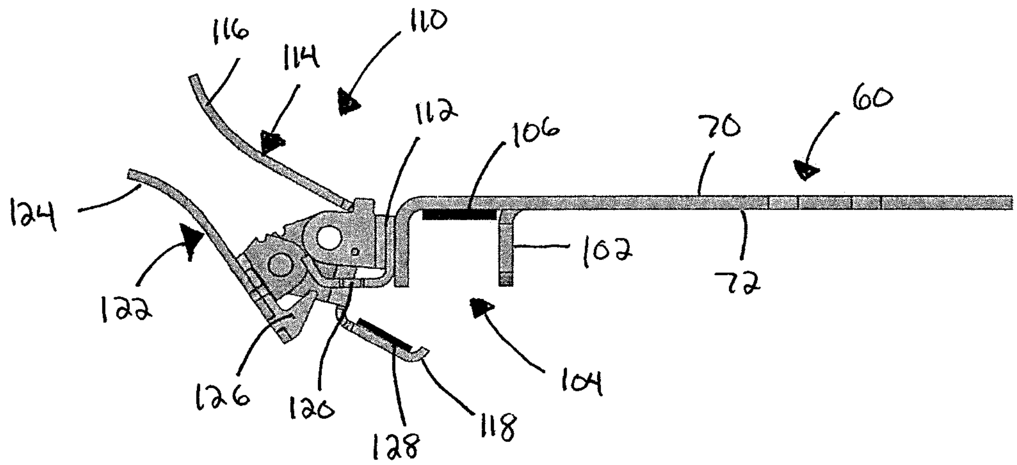
FIG. 17 shows the cross section indicated by line A-A in FIG. 14 and shows the locking mechanism in an unlocked position.
Figure 18:
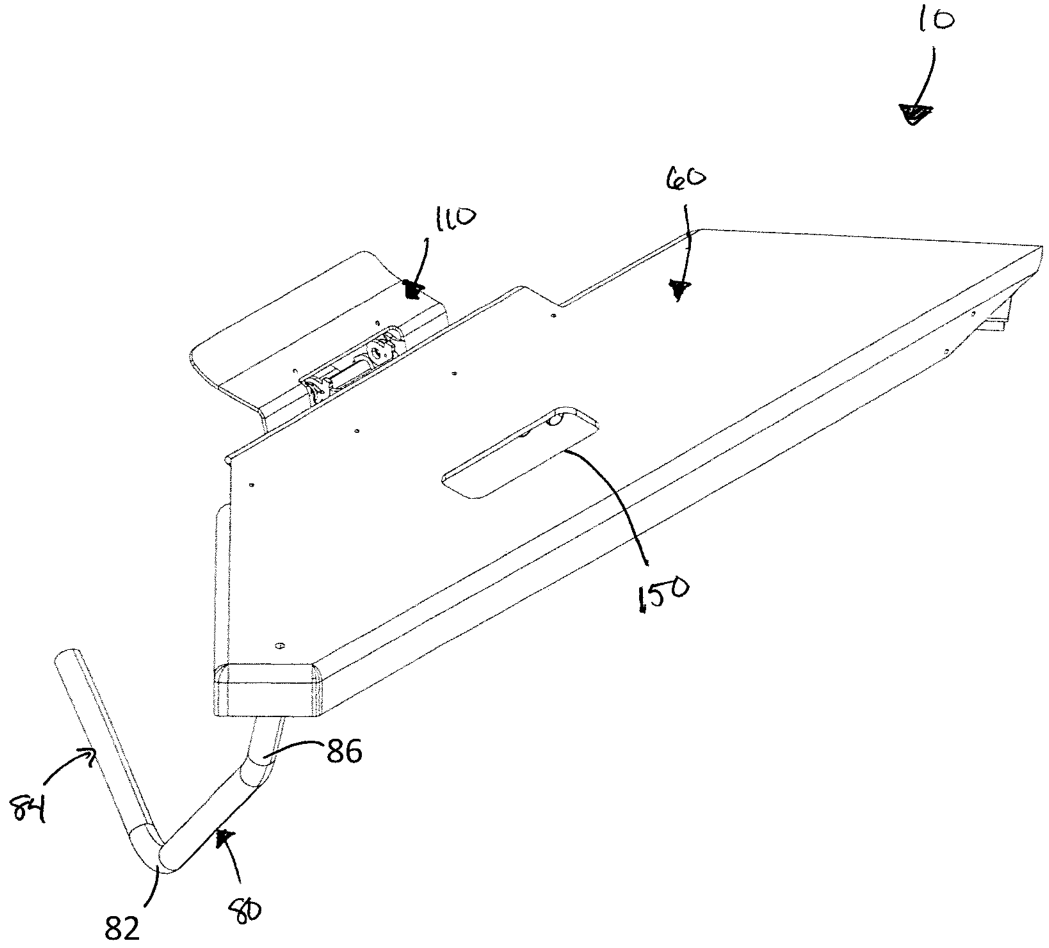
FIG. 18 is a top perspective view of the support platform assembly with the support arm in an open position.
Figure 19:
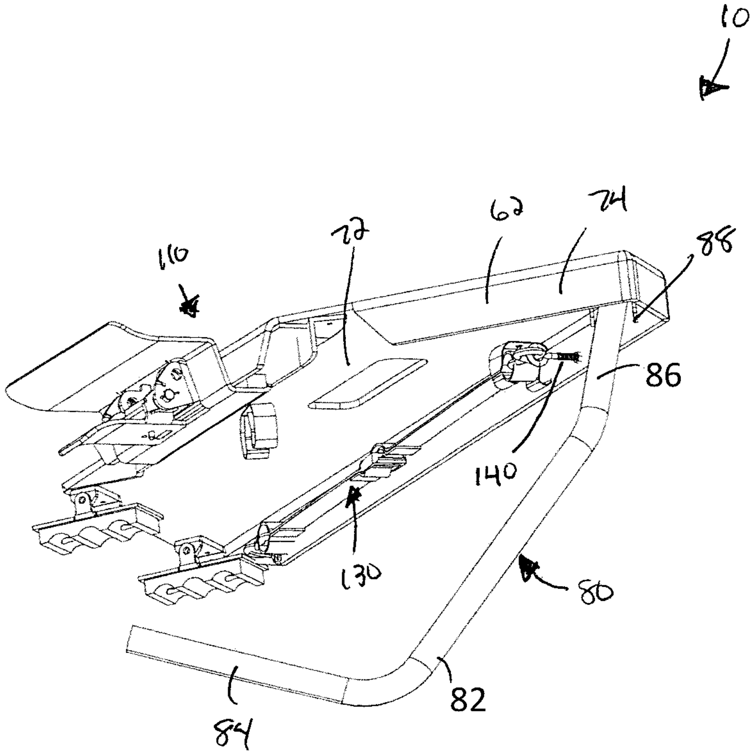
FIG. 19 is a bottom perspective view of the support platform assembly with the support arm in an open position.
Figure 20:
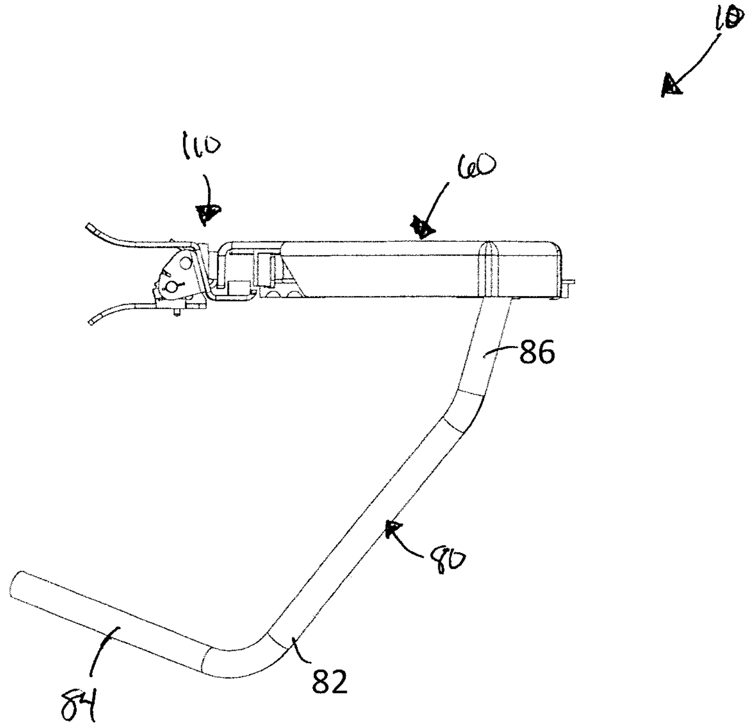
FIG. 20 is a front view of the support platform assembly with the support arm in an open position.

The support platform assembly 10 engages the standoff bracket 12 with a mounting channel 100. The mounting channel 100 may be located on the bottom 72 of the platform 60 at the mounting side 66 of the platform. The mounting channel 100 is formed between a channel guide 102 connected to the bottom 72 of the platform 60 and the sidewall 74 at the mounting side 66 of the platform 60. As illustrated, the channel guide 102 may be made out of L-shaped angle stock that is connected to the bottom 72 of the platform 60. The channel guide 102 may be connected to the bottom 72 of the platform 60 by a plurality of mechanical fasteners likes bolt, pins, or rivets. Alternatively, the channel guide 102 may be welded or chemically bonded to the bottom 72 of the platform 60. As shown in FIGS. 16-17, the mounting channel 100 may be substantially U-shaped with an opening 104 that faces downward, extending from the bottom 72 of the platform 60 and configured to receive the mounting rail 40 of the standoff bracket 12. A resilient pad 106 may be placed on the bottom 72 of the platform 60 within the mounting channel 100. The resilient pad 106 can provide some shock absorption and/or grip while the support platform assembly 10 is being installed and used.

To prevent the support platform assembly 10 from disengaging the standoff bracket 12, the support platform assembly 10 includes a locking assembly 110 attached to the sidewall 74 at the mounting side 66 of the platform 60. The locking assembly 110 includes a mounting bracket 112 to attach it to the sidewall 74. A push lever 114 is pivotally attached to the mounting bracket 112. The push lever 114 has a handle 116 on one end and a clamp 118 on the other end. The clamp 118 is configured to cover the opening 104 of the mounting channel 100. A release lever 122 is pivotally mounted to the push lever 114. The release lever 122 has a handle 124 on one end and a pawl 126 on the other end that is configured to engage a hole 120 in the mounting bracket. To provide cushioning between the standoff bracket 12 and the locking assembly 110, a pad 128 can be included on the part of the clamp 118 that covers the opening 104 of the mounting channel 100. The pad 128 may be made of a resilient material like rubber or foam. In certain embodiments, the pad 128 can have a thickness of ½ inch. The pad 128 may provide cushioning against the underside of the mounting rail 40. When engaged with the underside of the mounting rail, the pad 128 minimizes wear on the standoff bracket 12 and provides a tighter clamping fit that can minimize sliding of the support platform assembly 10 on the standoff bracket 12. The use of the pad 128 allows for greater tolerances between the clamp 118 and the mounting channel 100 because the pad 128 can compress to provide the clamping fit.

The locking assembly 110 has an unlocked and a locked position. In the unlocked position, as illustrated in FIG. 17, the clamp does not cover the opening 104 of the mounting channel 100 and the mounting channel 100 can be placed on the mounting rail 40 of the standoff bracket 12. Once the mounting channel 100 is placed on the mounting rail 40, the locking assembly 110 can be placed in the locked position by pressing the handle 116 of the push lever 114 down. While a user presses the handle 116 of the push lever 114 down, thus placing the locking assembly 110 in the locked position, the clamp 118 is pivoted over the opening 104 of the mounting channel 100. In the locked position, shown in FIG. 16, the clamp 118 prevents the support platform assembly 10 from disengaging the standoff bracket 12, and the pawl 126 of the release lever engages the hole 120 in the mounting bracket 112 of the locking assembly 110 to lock the assembly in place. The release lever 122 is biased toward the locked position, for instance with a torsion spring. To change from the locked position to the unlocked position, the handle 124 of the release lever 122 can be squeezed toward the push lever 114 and the push lever 114 can be pivoted upwards to move the clamp 118 from blocking the opening 104 of the mounting channel 100.

Figure 15:
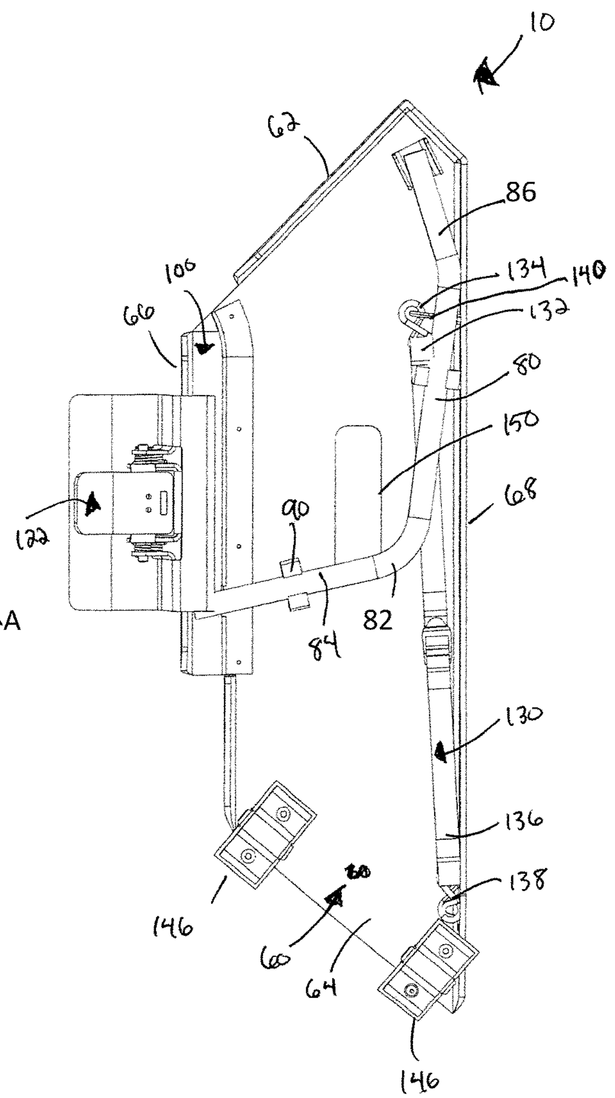
FIG. 15 is a bottom view of the support platform assembly.

To prevent the support platform assembly 10 and the standoff bracket from sliding away from and out of the ladder 14 once they are installed, the support platform assembly 10 may include a restraining strap 130 as shown in FIG. 15. The restraining strap 130 includes a first end 132 having a first connector 134 and a second end 136 opposite the first end 132 having a second connector 138. The first connector 134 and the second connector 138 may be a hook, clip, carabiner, eyelet, d-ring, buckles or some other suitable connector. The first end 132 of the restraining strap 130 may be connected to the bottom 72 of the platform 60 with a restraining strap mount 140, for instance an eye bolt. It will be appreciated that the restraining strap mount 140 can be placed at other locations on the platform, for instance on one of the sidewalls. In an alternative embodiment, the first connector 134 may be connected, permanently or removably, to the support arm 80. For instance, the first connector 134 may be connected with a connector at the second end 86 of the support arm 80. A second restraining strap mount 140 can be included on the bottom 72 of the platform 60 so the second end 136 of the restraining strap 130 can be coupled to it and can be stowed during storage and transportation. The restraining strap 130 may be made of a strong, but flexible fabric, woven fabric or webbing such as nylon, polyester, polypropylene, cotton, or some other suitable fabric.

Once the standoff bracket 12 is installed and the support platform assembly 10 is installed and locked to the standoff bracket 12, the second end 136 of the restraining strap 130 can be wrapped around the first or second rails 20 or 22 of the ladder 14 and/or the at least one rungs 24 of the ladder 14. Once wrapped around the ladder 14, the second connector 138 of the restraining strap 130 can engage a hole or mounting point located on the support platform assembly 10. In one embodiment, the second connector 138 of the restraining strap 130 can engage a hole or mounting point in the release lever 122 of the locking assembly 110. In an alternative embodiment, the second connector 138 of the restraining strap 130 can engage a hole or mounting point in the push lever 114. To firmly secure the standoff bracket 12 and the support platform assembly 10 to the ladder 14, the restraining strap 130 may be adjustable. For instance, the restraining strap 130 can be tightened and loosened through the use of common strap slip locks, cam buckles, sliders, or adjustable buckles included on the restraining strap 130. Once tightened, the engagement of the second connector 138 with the hole in the push lever 114 or the release lever 122 can provide constant downward tension on the push lever 114 or the release lever 122 preventing the inadvertent disengagement of the locking assembly 110.

Returning to FIGS. 11, 12, and 15, to be able to adapt to a variety of the roof pitches, the support platform assembly 10 includes at least one shoe 146 at the distal end 64 of the platform 60. The at least one shoe 146 is pivotally mounted to the bottom 72 of the platform 60. The pivoting of the at least one shoe 146 allows the support platform assembly 10 to adapt to roofs with a roof pitch between 5-12 and 12-12 or approximately 22 degrees to 45 degrees. The at least one shoe 146 may have a foot pad 148 that contacts the roof and may increase friction between the shoe and the roof to prevent the support platform assembly 10 from sliding. The foot pad 148 may be made of a non-marring material like rubber or plastic to prevent any damage to the roof. As illustrated in the Figures, the support platform assembly 10 includes two evenly spaced shoes 146. In the alternative, additional shoes 146 may be used or one wide shoe may be used to contact the roof. In an alternative embodiment, the at least one shoe 146 may be fixedly mounted to the bottom 72 of the platform 60. In this embodiment, the foot pads 148 may be curved to provide a broad range of points that can contact the roof to allow the platform assembly 10 to adapt to contact roofs with a roof pitch between 5-12 and 12-12 or approximately 22 degrees to 45 degrees.

To facilitate carrying the support platform assembly 10, the platform 60 includes a handle 150. The handle 150 may be a cut out extending through the platform 60 at its center of gravity or near its center of gravity so the support platform assembly 10 will be sufficiently balanced when a user is carrying it. As illustrated, the handle 150 can be substantially rectangular, however, other suitable shapes can be used.

Figure 14:
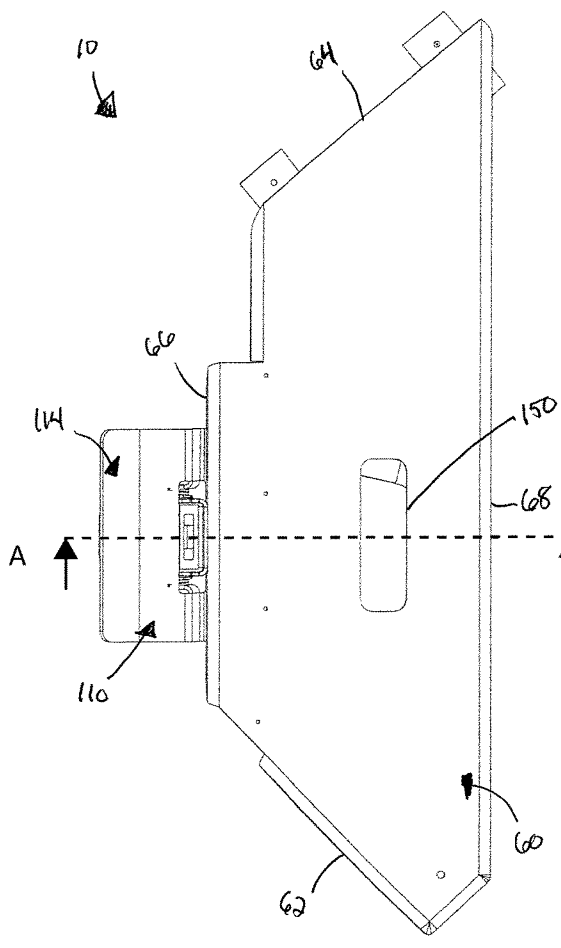
FIG. 14 is a top view of the support platform assembly.

The support platform assembly 10 includes some safety features and certain design elements that can serve as reminders. When the support arm 80 is in the stowed position, the support arm peg 84 extends through a cutout 108 in the channel guide 102 and into the mounting channel 100. In the stowed position, the support arm peg 84 interferes with the mounting channel 100 and prevents the support platform assembly 10 from engaging the mounting rail 40 of the standoff bracket 12 while the support arm 80 is in the stowed position. In other words, the support arm 80 is positioned such that a user cannot mount the support platform assembly 10 onto a standoff bracket 12 without first maneuvering the support arm 80 out of the stowed position and into the open position. Additionally, the handle 150 acts as a reminder to install the support arm 80 when using the support platform assembly 10. When the support arm 80 is in the stowed position as described above, a portion of the handle 150 overlaps the support arm 80 as illustrated in FIGS. 14 and 15. This arrangement and overlap of the support arm 80 causes a user's hands to make contact with the support arm 80 when attempting to hold the support platform assembly 10 by the handle 150, and therefore reminds the user to first install and secure the support arm 80 into an opening 30 in the ladder 14.

Now the process of installing and using the support platform assembly 10 will be described. A user first installs the standoff bracket 12 by sliding the bottom peg 54 and top peg 56 into openings 30 of rungs of the ladder 14. The user raises the ladder 14 by extending the ladder, if possible, and resting it against the edge of the roof 18. Prior to carrying the support platform assembly 10 up the ladder 14, the user changes the support arm 80 from its stowed position to its open position. Once at the top of the ladder 14, the user can slide the support arm peg 84 into an opening 30 of a rung 24 below the rungs 24 engaged with the standoff bracket 12. With the support arm peg 84 installed, the user can pivot and rotate the platform 60 downwards towards the standoff bracket 12 so the mounting channel 100 is aligned and engaged with the mounting rail 40 of the standoff bracket 12 and the shoes 146 contact the roof. Once the mounting channel 100 is engaged with the mounting rail 40, the locking mechanism 110 can be placed in the locked position by pressing down on the push lever 114. To prevent the support platform assembly 10 and the standoff bracket 12 from disengaging the ladder 14, the second end 136 of the restraining strap 130 is wrapped around the ladder rails 20, 22 and/or rungs 24, connected to a portion of the support platform assembly 10, such as the push lever 114, with the second connector 138, and tightened to provide downward tension on the push lever 114. The user can then use the support platform assembly 10 to step on and off the ladder 14. The above steps can be completed one-handed and allows the user to satisfy recommended safety standards by maintaining three points of contact with the ladder.

It will be appreciated that the support platform assembly 10 can be uninstalled from the ladder by completing the above described steps in reverse. First, the user can disconnect the second connector 138 of the restraining strap 130 from the support platform assembly 10, for instance from the push lever 114. The user can unwrap the second end 136 of the restraining strap 130 from the ladder rails 20,22 and/or rungs 24 and allow it to hang freely from the bottom 72 of the platform 60. If necessary, the user can loosen the retaining strap 130 prior to disconnecting the second connector 138 from the platform assembly 10 or unwrapping the retaining strap 130. To disengage the locking mechanism 110, the user can squeeze the release lever 122 upward toward the push lever 114 to disengage the pawl 126, and the user can pivot the push lever 114 and release lever 122 upward toward the top 70 of the platform 60 into to the unlocked position. The user can then lift upward on the platform assembly 10 to pivot and rotate the platform assembly 10 away from the standoff bracket 12 to disengage the mounting channel 100 from the mounting rail 40 of the standoff bracket 12. Once the support platform assembly 10 is disengaged from the standoff bracket 12, the user can slide the support arm peg 84 out of the opening 30 of the rung 24 and proceed to carry the support platform assembly 10 down the ladder. The support arm 80 and the retaining strap 130 can be placed in their respective stowed positions for transport and storage. Similar to installation, these steps can be completed one-handed and allows the user to satisfy recommended safety standards by maintaining three points of contact with the ladder.

In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A platform assembly comprising:

a platform having a top, a bottom, a proximal end, a distal end opposite the proximal end, a mounting side, an external side opposite the mounting side, and a mounting channel extending downward from the bottom of the platform at the mounting side of the platform, the distal end being configured to engage a roof;

a support arm having a first end configured to engage a ladder, and a second end opposite the first end;

a support arm mount rotatably connected to the bottom of the platform at the proximal end and the external side, wherein the second end of the arm is pivotally mounted to the support arm mount, a standoff bracket configured to removably engage a side of the ladder above the first end of the support arm, the standoff bracket having a mounting rail that extends outward from the side of the ladder and is angled away from the ladder at an angle, the mounting rail being configured to engage and be received within the mounting channel; and a locking mechanism attached to the mounting side of the platform, wherein the locking mechanism is configured to cover the mounting channel while in a locked position, and uncover the mounting channel while in an unlocked position, wherein when the standoff bracket is engaged with the side of the ladder and the platform is supported by the engagement of the first end of the arm with the ladder, the engagement of the mounting channel with the mounting rail, and the engagement of the distal end with the roof, and upon the engagement of the mounting channel with the mounting rail, the platform aligns at the angle of the mounting rail and is configured to engage the roof to support a user moving between the ladder and the roof.

2. The platform assembly of claim 1, wherein the first end of the support arm includes a support arm peg configured to engage the ladder by sliding into an opening of a rung in the ladder, wherein the support arm mount allows the support arm to rotate such that when the support arm is engaged with the ladder the support arm peg extends in an outward direction relative to the platform to engage the rung.

3. The platform assembly of claim 1, wherein the locking mechanism further comprises a push lever connected to a clamp and a spring-biased release lever with a pawl configured to engage a hole on the locking mechanism.

4. The platform assembly of claim 3, wherein the locking mechanism is configured to be placed in the locked position by pushing downward on the push lever which engages the pawl with the hole on the locking mechanism, and the locking mechanism is further configured to be placed in the unlocked position by squeezing the release lever toward the push lever to disengage the pawl from the hole and pulling upward on the release lever and pull lever.

5. The platform assembly of claim 1, further comprising one or more shoes pivotally mounted to the bottom of the platform at a distal end of the platform and configured to rest on a roof when the platform assembly is installed on the ladder.

6. The platform assembly of claim 5, wherein the one or more shoes are configured to pivot to accommodate roofs with a roof pitch in a range of 5-12 to 12-12.

7. The platform assembly of claim 1, further comprising a restraining strap with a first end connected to the bottom of the platform and a second end configured to wrap around the ladder and tighten to prevent the platform assembly from sliding away from or disengaging the ladder.

8. The platform assembly of claim 7, wherein the second end of the restraining strap is configured to removably couple to the locking mechanism to apply downward tension on the locking mechanism when the restraining strap is tightened to hold the locking mechanism in the locked position.

9. The platform assembly of claim 1, the platform further comprising a handle extending through the platform at or near the platform's center of gravity.

10. The platform assembly of claim 1, wherein the support arm has a stowed position where the support arm is held flat against the bottom of the platform and an open position configured to allow a user to install the platform assembly on the ladder.

11. The platform assembly of claim 10, wherein while the support arm is in the stowed position, the support arm is positioned such that a support arm peg interferes with the mounting channel by extending through a cutout in the mounting channel into the mounting channel to prevent the mounting channel from engaging a mounting rail of a standoff bracket.

12. The platform assembly of claim 1, wherein the mounting channel of the platform assembly is configured to receive and rest on a mounting rail of a standoff bracket installed on a side of the ladder.

13. A platform assembly comprising:

a platform having a top, a bottom, a proximal end, a distal end opposite the proximal end, a mounting side, an external side opposite the mounting side, and a mounting channel extending downward from the bottom of the platform at the mounting side of the platform, the distal end being configured to engage a roof;

a support arm having a first end configured to engage a ladder, and a second end opposite the first end;

a support arm mount rotatably connected to the bottom of the platform at the proximal end and the external side, wherein the second end of the arm is pivotally mounted to the support arm mount; and a restraining strap with a first end connected to the bottom of the platform and a second end configured to wrap around the ladder and tighten to prevent the platform assembly from sliding away from or disengaging the ladder, wherein when the platform is engaged with the ladder, the platform extends outward from a side of the ladder and is angled away from the ladder and toward the roof to engage the roof, the platform being configured to support a user moving between the ladder and the roof.

14. The platform assembly of claim 13, further comprising at least one shoe pivotally mounted to the bottom of the platform and configured to rest on a roof when the platform assembly is installed on the ladder so platform assembly can adapt to roofs with a roof pitch in a range of 5-12 to 12-12.

15. The platform assembly of claim 14, wherein the at least one shoe further comprises a foot pad configured to increase friction and absorb shock between the platform assembly and the roof.

16. The platform assembly of claim 13, wherein the first end of the support arm includes a support arm peg configured to engage the ladder by sliding into an opening of a rung in the ladder.

17. The platform assembly of claim 13, further comprising a handle extending through the platform at or near the platform's center of gravity.

18. The platform assembly of claim 13, wherein the support arm has a stowed position where the support arm is held flat against the bottom of the platform and an open position configured to allow a user to install the platform assembly on the ladder.

19. The platform assembly of claim 18, wherein while the support arm is in the stowed position, the support arm is positioned such that a support arm peg interferes with the mounting channel by extending through a cutout in the mounting channel into the mounting channel to prevent the mounting channel from engaging a mounting rail of a standoff bracket.

20. A platform assembly for engaging a side of a ladder, the platform assembly comprising:

a platform having a top, a bottom, a proximal end, a distal end opposite the proximal end, and a mounting channel extending downward from the bottom of the platform at the proximal end of the platform, the distal end being configured to engage a roof;

a support arm having a first end configured to engage a side of a ladder, and a second end opposite the first end, wherein the second end is rotatably and pivotally mounted to the bottom of the platform; and a standoff bracket configured to removably engage the side of the ladder above the first end of the support arm, the standoff bracket having a mounting rail configured to be received within the mounting channel, wherein the platform extends outward from the side of the ladder and angled away from the ladder and is configured to support a user moving between the ladder and the roof when the platform is supported at the proximal end by the engagement of the first end of the support arm with the side of the ladder and by the engagement of the mounting channel with the mounting rail, and the platform is supported at the distal end by engagement of the distal end with the roof.

* * * * *